US007788413B1

(12) United States Patent
Justiss et al.

(10) Patent No.: US 7,788,413 B1
(45) Date of Patent: Aug. 31, 2010

(54) METHOD AND SYSTEM FOR HANDLING COMMANDS REQUESTING MOVEMENT OF A DATA STORAGE MEDIUM BETWEEN PHYSICAL MEDIA LIBRARIES

(75) Inventors: Steven A. Justiss, Lakeway, TX (US); Alexander Kramer, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 1338 days.

(21) Appl. No.: 11/118,167

(22) Filed: Apr. 29, 2005

(51) Int. Cl.
*G06F 3/00* (2006.01)
*G06F 7/00* (2006.01)
*G06F 19/00* (2006.01)

(52) U.S. Cl. .................... 710/5; 369/24.01; 369/30.15; 369/30.74; 700/214; 700/222; 700/245

(58) Field of Classification Search ................. None
See application file for complete search history.

(56) References Cited

U.S. PATENT DOCUMENTS

| | | | |
|---|---|---|---|
| 4,104,718 | A | 8/1978 | Poublan et al. |
| 4,430,701 | A | 2/1984 | Christian et al. |
| 4,945,428 | A | 7/1990 | Waldo |
| 5,214,768 | A | 5/1993 | Martin et al. |
| 5,455,926 | A | 10/1995 | Keele et al. |
| 5,506,986 | A | 4/1996 | Healy |
| 5,546,315 | A | 8/1996 | Kleinschnitz |
| 5,546,557 | A | 8/1996 | Allen et al. |
| 5,548,521 | A | 8/1996 | Krayer et al. |
| 5,568,629 | A | 10/1996 | Gentry et al. |
| 5,592,638 | A | 1/1997 | Onodera |
| 5,598,385 | A | 1/1997 | Mizukami et al. |
| 5,612,934 | A | 3/1997 | Dang et al. |
| 5,740,061 | A | 4/1998 | Dewey et al. |

(Continued)

FOREIGN PATENT DOCUMENTS

EP    1 156 408 A1    11/2001

(Continued)

OTHER PUBLICATIONS

Office Action issued in U.S. Appl. No. 11/046,019 dated Jan. 28, 2008.

(Continued)

*Primary Examiner*—Henry W. H. Tsai
*Assistant Examiner*—Michael Sun
(74) *Attorney, Agent, or Firm*—Sprinkle IP Law Group

(57) ABSTRACT

Embodiments of the present invention provide systems and methods for handling commands requesting movement of a data storage medium (magnetic tape, optical disk, or other medium) from a source media library to a destination media library using a pass through port. Prior to issuing commands requesting movement of the data storage medium from a source location to the pass through port and from the pass through port to a destination location, embodiments of the present invention can check the status of various locations (e.g., the destination location or pass through port) to determine if the movement requested in the original command can be completed successfully. Another embodiment of the present invention can maintain reservation flags for pass through ports so that the status of particular pass through ports can be determined and an available pass through port selected.

32 Claims, 6 Drawing Sheets

U.S. PATENT DOCUMENTS

| | | | |
|---|---|---|---|
| 5,761,503 A | 6/1998 | Fisher | |
| 5,764,615 A | 6/1998 | Ware et al. | |
| 5,790,852 A | 8/1998 | Salm | |
| 5,870,732 A | 2/1999 | Fisher et al. | |
| 5,892,633 A | 4/1999 | Ayres et al. | |
| 5,914,919 A | 6/1999 | Fosler et al. | |
| 5,925,119 A | 7/1999 | Maroney | |
| 5,956,301 A * | 9/1999 | Dimitri et al. | 369/30.31 |
| 5,959,866 A | 9/1999 | Hanaoka et al. | |
| 5,963,971 A | 10/1999 | Fosler et al. | |
| 5,971,281 A | 10/1999 | Frary et al. | |
| 6,018,760 A * | 1/2000 | Oishi et al. | 709/204 |
| 6,031,798 A | 2/2000 | James et al. | |
| 6,038,490 A * | 3/2000 | Dimitri et al. | 700/214 |
| 6,041,329 A | 3/2000 | Kishi | |
| 6,041,381 A | 3/2000 | Hoese | |
| 6,044,442 A | 3/2000 | Jesionowski | |
| 6,052,341 A | 4/2000 | Bingham et al. | |
| 6,058,494 A | 5/2000 | Gold et al. | |
| 6,085,123 A * | 7/2000 | Baca et al. | 700/214 |
| 6,185,165 B1 | 2/2001 | Jesionowski et al. | |
| 6,327,519 B1 | 12/2001 | Ostwald et al. | |
| 6,327,594 B1 | 12/2001 | Van Huben et al. | |
| 6,328,766 B1 * | 12/2001 | Long | 710/8 |
| 6,336,172 B1 | 1/2002 | Day, III et al. | |
| 6,356,803 B1 | 3/2002 | Goodman et al. | |
| 6,360,232 B1 | 3/2002 | Brewer et al. | |
| 6,374,241 B1 | 4/2002 | Lamburt et al. | |
| 6,385,706 B1 | 5/2002 | Ofek et al. | |
| 6,425,035 B2 | 7/2002 | Hoese et al. | |
| 6,425,059 B1 | 7/2002 | Basham et al. | |
| 6,480,934 B1 | 11/2002 | Hino et al. | |
| 6,487,561 B1 | 11/2002 | Ofek et al. | |
| 6,493,721 B1 | 12/2002 | Getchius et al. | |
| 6,507,883 B1 | 1/2003 | Bello et al. | |
| 6,507,889 B1 | 1/2003 | Tsurumaki et al. | |
| 6,574,641 B1 | 6/2003 | Dawson et al. | |
| 6,604,165 B1 | 8/2003 | Terao | |
| 6,665,786 B2 | 12/2003 | McMichael et al. | |
| 6,675,260 B2 | 1/2004 | Torrey et al. | |
| 6,715,031 B2 | 3/2004 | Camble et al. | |
| 6,725,352 B2 | 4/2004 | Goodman et al. | |
| 6,725,394 B1 | 4/2004 | Bolt | |
| 6,738,885 B1 | 5/2004 | Zhang et al. | |
| 6,763,419 B2 | 7/2004 | Hoese et al. | |
| 6,772,231 B2 | 8/2004 | Reuter et al. | |
| 6,804,753 B1 | 10/2004 | Moody, II et al. | |
| 6,839,824 B2 | 1/2005 | Camble et al. | |
| 6,845,431 B2 * | 1/2005 | Camble et al. | 711/152 |
| 6,950,723 B2 | 9/2005 | Gallo et al. | |
| 7,136,988 B2 | 11/2006 | Gallo | |
| 7,146,244 B2 * | 12/2006 | Byers et al. | 700/218 |
| 7,199,809 B1 | 4/2007 | Lacy et al. | |
| 7,200,546 B1 | 4/2007 | Nourmohamadian et al. | |
| 7,370,173 B2 | 5/2008 | Justiss et al. | |
| 7,428,613 B1 | 9/2008 | Justiss et al. | |
| 7,451,291 B2 | 11/2008 | Justiss et al. | |
| 7,454,565 B1 | 11/2008 | Justiss et al. | |
| 7,505,980 B2 | 3/2009 | Tyndall et al. | |
| 2001/0020197 A1 | 9/2001 | Nakano et al. | |
| 2002/0004883 A1 | 1/2002 | Nguyen et al. | |
| 2002/0019863 A1 | 2/2002 | Reuter et al. | |
| 2002/0144048 A1 | 10/2002 | Bolt | |
| 2002/0169521 A1 * | 11/2002 | Goodman et al. | 700/245 |
| 2002/0188592 A1 | 12/2002 | Leonhardt et al. | |
| 2002/0199077 A1 | 12/2002 | Goodman et al. | |
| 2003/0014585 A1 | 1/2003 | Ji | |
| 2003/0070053 A1 | 4/2003 | Gallo et al. | |
| 2003/0084240 A1 | 5/2003 | Torrey et al. | |
| 2003/0126360 A1 | 7/2003 | Camble et al. | |
| 2003/0126361 A1 | 7/2003 | Slater et al. | |
| 2003/0126362 A1 | 7/2003 | Camble et al. | |
| 2003/0126395 A1 | 7/2003 | Camble et al. | |
| 2003/0126396 A1 | 7/2003 | Camble et al. | |
| 2003/0126460 A1 | 7/2003 | Camble et al. | |
| 2003/0131157 A1 | 7/2003 | Hoese et al. | |
| 2003/0131253 A1 | 7/2003 | Martin et al. | |
| 2003/0135580 A1 | 7/2003 | Camble et al. | |
| 2003/0212873 A1 | 11/2003 | Lee et al. | |
| 2003/0221054 A1 | 11/2003 | Wu | |
| 2004/0044828 A1 | 3/2004 | Gibble et al. | |
| 2004/0044871 A1 | 3/2004 | Weber et al. | |
| 2004/0054838 A1 | 3/2004 | Hoese et al. | |
| 2004/0064641 A1 | 4/2004 | Kodama | |
| 2004/0088513 A1 | 5/2004 | Biessener et al. | |
| 2004/0107300 A1 | 6/2004 | Padmanabhan et al. | |
| 2004/0111580 A1 | 6/2004 | Weber et al. | |
| 2004/0133915 A1 | 7/2004 | Moody, II et al. | |
| 2004/0139094 A1 | 7/2004 | Tyndall et al. | |
| 2004/0139240 A1 | 7/2004 | DiCorpo et al. | |
| 2004/0139260 A1 | 7/2004 | Steinmetz et al. | |
| 2004/0148460 A1 | 7/2004 | Steinmetz et al. | |
| 2004/0148461 A1 | 7/2004 | Steinmetz et al. | |
| 2006/0069844 A1 | 3/2006 | Gallo et al. | |
| 2006/0149919 A1 | 7/2006 | Arizpe et al. | |
| 2006/0174071 A1 | 8/2006 | Justiss et al. | |
| 2007/0162656 A1 * | 7/2007 | Bryan et al. | 710/38 |
| 2009/0049224 A1 | 2/2009 | Justiss et al. | |

FOREIGN PATENT DOCUMENTS

| | | |
|---|---|---|
| WO | WO 02/27463 A2 | 4/2002 |
| WO | WO03/104971 A1 | 12/2003 |
| WO | WO 2004/044783 A2 | 5/2004 |
| WO | WO 2004/044784 A2 | 5/2004 |

OTHER PUBLICATIONS

Office Action issued in U.S. Appl. No. 10/880,360 dated Aug. 29, 2007.

Office Action issued in U.S. Appl. No. 10/704,265 dated Feb. 1, 2008.

CNET Glossary: Terms for the techie: controller, [online] pp. 1-2, downloaded from internet www.cnet.com/4520-6029_1-6040342-1.html?tag=txt retrived on Jul. 27, 2007.

CNET Glossary: Terms for the techie: crawler, [online] pp. 1-2, downloaded from internet www.cnet.com/4520-6029_1-6040342-1.html?tag=txt retrived on Jul. 27, 2007.

Griswold, "Storage Topologies", [online] pp. 1-8, downloaded from internet www.crossroads.com/Library/CollateralDownloads.asp on Jul. 27, 2007, Dec. 2002.

SGI—OpenVault Glossary of Terms, [online] pp. 1-8, downloaded from Internet: www.sgi.com/products/software/openvault/glossary/html on Jul. 27, 2007, 1993-2007, source SGI.

Tape Solutions: Router vs. Native Fibre Channel, Crossroads White Paper, pp. 1-7, Doc. Version #001, Crossroads Systems, Inc., Apr. 29, 2002.

Office Action issued in U.S. Appl. No. 11/046,019, mailed Jan. 7, 2009, Justiss, 13 pages.

Office Action issued in U.S. Appl. No. 10/703,965, mailed Mar. 24, 2009, Moody, 8 pages.

U.S. Patent Office Official Action issued in U.S. Appl. No. 11/046,019, Justiss et al., May 9, 2007.

U.S. Patent Office Official Action issued Jul. 5, 2007 in U.S. Appl. No. 11/046,066, Justiss et al., Jul. 5, 2007.

U.S. Patent Office Official Action issued Jun. 28, 2007 in U.S. Appl. No. 11/045,443, Justiss et al., Jun. 28, 2007.

Working Draft NCITS T10 Project 999D, "Information Technology—SCSI-3 Medium Changer Commands (SMC)", pp. 1-68, Mar. 14, 1998.

Working Draft INCITS T10 Project 1383D, "Information Technology—SCSI Media Changer Commands-2 (SMC-2)", pp. i-x and 1-58, Nov. 18, 2003.

International Search Report for PCT/US 03/35824, Dec. 6, 2004.

IInternational Search Report for PCT/US 03/25822, Dec. 6, 2004.

Office Action issued in U.S. Appl. No. 11/046,019 dated Jul. 23, 2008.
Office Action issued in U.S. Appl. No. 10/704,265 dated Jul. 21, 2008.
Office Action issued in U.S. Appl. No. 10/704,265 mailed May 3, 2007, 16 pgs.
Office Action issued in U.S. Appl. No. 10/704,265 mailed May 19, 2006, 18 pgs.
Office Action issued in U.S. Appl. No. 10/880,162 mailed Aug. 30, 2006, 5 pgs.
Office Action issued in U.S. Appl. No. 10/880,360 mailed Aug. 30, 2006, 5 pgs.
Office Action issued in U.S. Appl. No. 10/704,265 mailed Nov. 14, 2006, 16 pgs.
Office Action issued in U.S. Appl. No. 10/880,162 mailed Feb. 12, 2007, 6 pgs.
Office Action issued in U.S. Appl. No. 10/880,360 mailed Feb. 12, 2007, 6 pgs.
Office Action issued in U.S. Appl. No. 11/045,443, mailed Feb. 26, 2007, 13 pgs.
Office Action issued in U.S. Appl. No. 11/046,066, mailed Feb. 26, 2007, 17 pgs.
Office Action issued in U.S. Appl. No. 11/046,019, mailed Jun. 11, 2009, 15 pgs.
ANSI, SCSI-2 Specification archived on Jul. 12, 2002, retrieved from http://web.archive.org/web/20020712181903/http://ldkelley.com/SCSI2/SCSI2-17.html on Jun. 9, 2009, 30 pgs.
Office Action issued in U.S. Appl. No. 11/046,019 mailed Dec. 14, 2009, 17 pgs.
Office Action issued in U.S. Appl. No. 12/237,969 mailed Oct. 14, 2009, 7 pgs.

* cited by examiner

METHOD AND SYSTEM FOR HANDLING COMMANDS REQUESTING MOVEMENT OF A DATA STORAGE MEDIUM BETWEEN PHYSICAL MEDIA LIBRARIES

TECHNICAL FIELD OF THE INVENTION

The present invention relates to control of media libraries and, more particularly, to resolving issues related to the use of a pass through port between media libraries.

BACKGROUND OF THE INVENTION

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled based on commands received from host devices on the network. When specific data is required, the host device determines which cartridge slot contains the tape cartridge that holds the desired data. The host device then transmits a command to the media library to move the medium and the robot moves the tape cartridge.

In a SCSI tape library, devices that are part of the library are typically addressed by target number and logical unit numbers ("LUN"). Thus, each drive and media changer of a tape library typically has a target number and LUN. Cartridge slots, on the other hand, are addressed by element addresses that are used by the robot to locate the slots. Because the robot also places tape cartridges in the drives, each drive is also associated with an element address. The robot can also be assigned an element address. If multiple tape libraries are connected to a single device (e.g., a Fibre Channel to SCSI routing device), the tape libraries may be further addressed by bus number.

Traditional media libraries are limited in scalability because, in these systems, a robot is restricted to using only storage slots and drives in the same physical unit as the robot. If a user wishes to move a cartridge from one tape library to another, the user can have the robot move the cartridge to an export slot. The user then manually moves the cartridge to an import slot of another media library and commands the robot of the destination media library to move the cartridge to the appropriate storage element or drive. In practice, the use of import/export elements to move one cartridge at a time is tedious, so many users simply open the media libraries and manually move multiple cartridges from a source media library to a destination media library.

The scalability issues of traditional media libraries become more pronounced when multiple media libraries are shared among multiple host computers. As described in United States Provisional Patent Application No. 60/425,034, entitled "Method for Presenting a Single Logical Media Library Robotics Controller While Actually Operating Multiple Physical Media Library Robotics Controllers in an Aggregated Media Library Environment" filed Nov. 8, 2002, U.S. patent application Ser. No. 10/704,265, entitled "System and Method for Controlling Access to Multiple Physical Media Libraries" filed Nov. 7, 2003, and U.S. patent application Ser. No. 10/703,965, entitled "System and Method for Controlling Access to Media Libraries" filed Nov. 7, 2003, each of which is hereby fully incorporated by reference herein, multiple media libraries can be aggregated into a single logical media library and the logical media library can be partitioned into multiple library partitions, with different partitions being presented to different hosts. If a particular partition contains storage elements and/or drives from multiple physical media libraries, this can lead to a host issuing a command to move a cartridge from an element (e.g., storage or data transport) in one physical media library to an element in another physical media library when the cartridge cannot be so moved without human intervention.

One recent improvement on media libraries has been the development of pass through ports, alternatively known as elevators. A pass through port is essentially an import/export element at a media library connected to a corresponding export/import element at another media library by a mechanism that can automatically pass the cartridge, optical disk or other media between media libraries. While the development of pass through ports allows tapes or other media to be shared between media libraries, pass through ports present their own complications.

One issue with pass through ports is that multiple hosts may issue commands that require utilization of the pass through ports. This can lead to contention between commands. Another issue is that the media changer of one media library may not be aware of the status of the other media library. For example, if a command is issued to move a cartridge from a storage element at one media library to a drive at another media library, but the destination drive is busy, the media changer at the first media library typically will not know this. While the robot at the first media library can move the cartridge from the storage element to the pass through port, the robot at the second media library will not be able to move the cartridge from the pass through port to the destination drive. The cartridge will now be stuck at the second media library as the robot will not know where to put it, causing an error. Consequently, there is a need for a mechanism to effectively manage commands that utilize the pass through port.

SUMMARY OF THE INVENTION

Embodiments of the present invention provide a system and method for handling commands that require moving media from one media library to another media library using a pass through port.

As a brief note about terminology, the terms "original command" and "original MOVE MEDIUM command" refer to command received by a media library access controller (e.g., received from hosts) that the Media library access controller processes according to various embodiments of the present invention. The media library access controller can receive multiple original commands from the same host or various hosts requesting movement of a data storage medium from one physical media library to another physical media library. The terms "first" command and "second" command (e.g., first MOVE MEDIUM command and second MOVE MEDIUM command) are generally used to differentiate the various commands of the same type, potentially having different properties or arguments, and are not in and of themselves intended to imply a temporal order. It should be noted that the host may issue the original MOVE MEDIUM command to a logical library partition of an aggregated media library and not be aware that there are multiple physical media libraries.

One embodiment of the present invention includes a media library access controller that controls access to two (or more) physical media libraries connected by a pass through port (i.e., a port by which a data storage medium can be passed from one media library to another). When the media library access controller receives an original MOVE MEDIUM command (i.e., a MOVE MEDIUM command from a host or other device that requests movement from one physical media library to another), the media library access controller determines if the command requires movement of a medium from one physical media library to another. If so, the media library access controller can queue commands corresponding to the original MOVE MEDIUM COMMAND, including, but not limited to a READ ELEMENT STATUS command to determine the if the destination location is available, a first MOVE MEDIUM command to move the medium from the source location to the pass through port and a second MOVE MEDIUM command to move the medium from the pass through port to the destination location. Each of the queued commands can be considered a state of the overall event of the original MOVE MEDIUM command as they are used to effect the movement requested in the original MOVE MEDIUM command.

The task that manages the queue can issue the READ ELEMENT STATUS command to the destination media library to determine if the destination element is available. If the destination element is available, the media library access controller enqueues the MOVE MEDIUM command to the source media library to move the medium from the source location to the pass through port and a MOVE MEDIUM command to the destination media library to move the medium from the pass through port to the destination element. At the appropriate time, the task that manages the queue issues the first MOVE MEDIUM command to the source media library. If the first MOVE MEDIUM command completes properly, the task issues the second MOVE MEDIUM command to the destination media library. Thus, the media library access controller essentially breaks the original MOVE MEDIUM command into three phases: a status phase, a first movement phase to move the data storage medium from the source location to the pass through port and a second movement phase to move the data storage element from the pass through port to the destination location.

One embodiment of the present invention includes a method comprising receiving an original MOVE MEDIUM command requesting movement of a data storage medium from a source element at a source physical media library to a destination element at a destination physical media library, issuing a first READ ELEMENT STATUS command to the destination physical media library to determine the status of the destination element, issuing a first MOVE MEDIUM to the source physical media library to move the data storage medium from the source element to a first element associated with the pass through port (e.g., an import/export element at the source media library) if the destination element is free and, if the first MOVE MEDIUM command completes successfully, issuing a second MOVE MEDIUM command to the destination physical media library to move the data storage medium from a second element associated with the pass through port (i.e., a corresponding import/export element at the destination media library) to the destination element.

Another embodiment of the present invention includes a computer program product having a set of computer instructions that are executable to issue a first READ ELEMENT STATUS command to a destination physical media library to determine the status of a destination element based on an original MOVE MEDIUM command requesting movement of a data storage element from a source media library to a destination media library connected by a pass through port. The computer instructions can be further executable to issue a first MOVE MEDIUM to the source physical media library to move the data storage medium from the source element to a first element associated with the pass through port if the destination element is free, and if the first MOVE MEDIUM command completes successfully, issue a second MOVE MEDIUM command to the destination physical media library to move the data storage medium from a second element associated with the pass through port to the destination element.

Yet another embodiment of the present invention provides a media library access controller configured to control access by a host to a source media library and a destination media library that are connected to each other by a pass through port. The media library access controller comprises a processor, a computer readable medium accessible by the processor and a set of computer instructions stored on the computer readable medium. The set of computer instructions comprise instructions that are executable by the processor to issue a first READ ELEMENT STATUS command to a destination physical media library to determine the status of a destination element based on an original MOVE MEDIUM command requesting movement of a data storage element from a source media library to a destination media library connected by a pass through port. If the destination element is free, the computer instructions are further executable to issue a first MOVE MEDIUM to the source physical media library to move the data storage medium from the source element to a first element associated with the pass through port and if the first MOVE MEDIUM command completes successfully, issue a second MOVE MEDIUM command to the destination physical media library to move the data storage medium from a second element associated with the pass through port to the destination element.

Another embodiment of the present invention includes a method for handling a command requesting movement of a data storage medium between physical media libraries that comprises receiving an original command requesting movement of a data storage medium from a source location at a source physical media library to a destination location at a destination physical media library determining if the movement requested by the original command can be completed based on a status, and if it is determined that the data storage medium can be moved to the destination location based on the status: issuing a first command to the source media library to move the data storage medium from the source location to the pass through port and issuing a second command to the destination media library to move the data storage medium from the pass through port at the destination media library to the destination location.

Another embodiment of the present invention includes a method for selecting a pass through port that comprises maintaining a set of reservation flags at a media library access controller for one or more pass through ports connecting source and destination media libraries, receiving an original command requesting movement of a data storage medium from a source location at a source physical media library to a destination location at a destination physical media library determining if a particular pass through port is available based on the set of reservation flags and if the particular pass through port is available, marking that pass through port as reserved in the set of reservation flags.

Yet another embodiment of the present invention includes a method for handling a command requesting movement of a data storage medium between two physical media libraries comprising receiving an original command requesting movement of a data storage medium from a source element at a source physical media library to a destination element at a destination physical media library connected by a pass through port, queuing a sequence of commands for the original command, wherein the sequence of commands include a first command to move the medium from a source location to the pass through port and a second command to move the medium from the pass through port to the destination location at the destination media library, issuing the first command to the source media library, if the first command completes successfully, issuing the second command to the destination media library. It should be noted that the sequence of commands can be queued using any appropriate queuing scheme known or developed in the art. The method can further include issuing the sequence of commands for the original command before issuing a sequence of commands for a subsequent original command.

The present invention provides an advantage over prior art systems and methods of by increasing the likelihood that movement of a data storage medium between physical media libraries can be completed successfully before commands are issued to the media libraries to move the medium.

The present invention provides another advantage by locating available pass through parts to avoid contention for the same pass through port.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for handling commands that request movement of a data storage medium from one media library to another media library using a pass through port. According to one embodiment of the present invention, a media library access controller (i.e., a device that controls access by hosts to physical media libraries) can receive a command from a host that will require the movement of a medium from a source location at a source media library to a destination location in a destination media library. The media library access controller determines whether the command can be carried out based on, for example, the status of the destination element or pass through port. If the command can not be carried out because of issues at the destination element or pass through port, the media library access controller can return the status information to the host. If the command can be carried out, the media library access controller issues a command to the source media library to move the medium from the source location to the pass through port and a command to the destination media library to move the medium from the pass through port to the destination location.

It should be noted that when a host application issues the original command, the host application may not be aware that the command will require movement of a medium from one physical media library to another physical media library. This is because the host application is presented with an "aggregated" media library having logical addresses that map to physical addresses. To the host, the "aggregated" library looks like one physical library with physical element addresses. The addresses seen by the host application, however, may be mapped to physical addresses at multiple physical media libraries.

Figure 1:
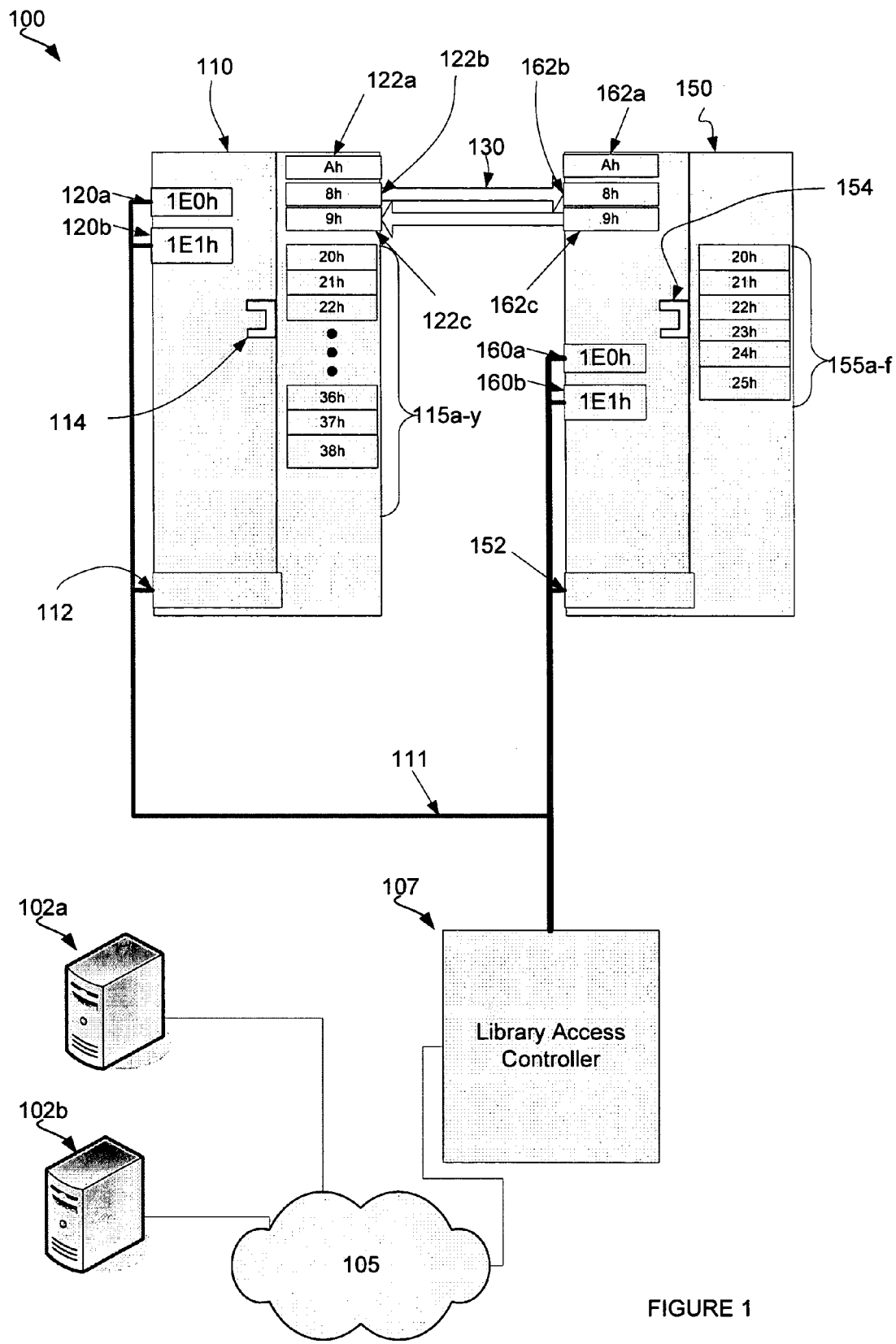
FIG. 1 is a diagrammatic representation on one embodiment of a system in which embodiments of the present invention can be implemented.

FIG. 1 illustrates one embodiment of a system 100 in which embodiments of the present invention can be implemented. System 100 includes multiple hosts 102a-102b connected via a first data transport medium 105 (e.g., a storage area network, a LAN, a WAN or other network known in the art) to a library access controller 107 ("controller 107") that controls access to media libraries 110 and 150. Controller 107 can be connected to media libraries 110 and 150 by a second data transport medium 111 that can be the same as or different than first data transport medium 105. In other embodiments, controller 107 can be connected to media libraries 110 and 150 by different data transport media (e.g., separate SCSI busses, a SCSI bus and a Fibre Channel network or other data transport media).

Media library controller 107 can be located at any point in the command path including at a storage router, a controller at one of the media libraries or other device in the command path. One example of a device that can act as media library access controller is the Crossroads 6,000 storage router of Austin, Tx based Crossroads Systems, Inc. Example media libraries include L700e media libraries managed by Automated Cartridge System Library Software by Storage Technology Corporation of Louisville, Colo.

Each media library is typically a variation of a SCSI media changer, which generally contains at least one media changer (media changer 112 and media changer 152) with an associated medium transport element (alternatively referred to as a "robot" or "picker") (media transport element 114 and media transport element 154), multiple storage elements (storage elements 115a-y and 155a-f) that can store storage volumes (e.g., tape cartridges, optical disks), and multiple data transfer elements (drives), represented at 120a and 120b for media library 110 and 160a and 160b for media library 150. Each media library can also have multiple import/export slots. For example, media library 110 can include import/export slots 122a-c and media library 150 can include import/export slots 162a-c. Each media changer is a microprocessor based embedded controller that controls the corresponding medium transport element.

The medium transport elements physically move storage volumes (i.e., the data storage media) from one element to another based on element addresses provided to the media changer. For example, medium transport element 114 can move a storage volume from a storage element in media library 110 to a data transfer element in media library 110 in response to a "MOVE MEDIUM" command.

To comply with the SCSI-2 and SCSI-3 standards, physical media libraries use contiguous element addresses for elements of an element type. By way of example, physical media library 110 can have the following addresses for the various elements: medium transport element 112 can have an element address of 00h, data storage elements 115a-y can have addresses of 20h-38h, import/export element 122a-c can have an address of 8h, 9h and Ah, and data transfer elements 120a and 120b can have addresses of 1E0h-1E1h. Similarly, physical media library 150 can use the following physical element address: medium transport element 152 can have an element address of 00h, data storage elements 155a-f can have addresses of 20h-25h, import export elements 162a-c can have element addresses of 8h, 9h and Ah, and data transfer elements 160a and 160b can have element addresses of 1E0h-1E1h.

It should be noted that the addresses provided above and used throughout are arbitrary addresses used for the sake of explanation. The present invention can be implemented for any set of element addresses used by the physical media libraries. For example, the L700e typically uses element addresses for each element type beginning with the following element address: 0h for medium transport element, 1F4h for data transfer elements, 3E8h for data storage elements, and Ah for import/export elements not associated with a pass through port. Additionally, the L700e uses 8h and 9h for import/export elements associated with the pass through port.

The import/export slots of the two media libraries can be connected to form a pass through port. In the example of FIG. 1, export slot 122b is connected to import slot 162b and import lot 122c is connected to export slot 162c to form pass through port 130. In this example, the pass through port is a single unit with a pair of import/export elements that are shared between the physical libraries. It should be noted that while this implies a directionality (i.e., export slot 122b and import slot 162b are used to pass media from media library 110 to media library 150, while import slot 122c and export slot 162 are used to pass media from media library 150 to media library 110), import/export element pairs of a pass through port can be used to pass media in either direction. Using the example addresses give above, element address 8h of media library 110 corresponds to the element used to pass the media to another media library and 8h of media library 150 corresponds to the element that is used to receive media from another media library.

Media library controller 107 can aggregate media libraries 110 and 150 into an aggregated media library and present partitions of the aggregated media library to the hosts. In essence, a library partition represents a host's view of the physical media libraries behind media library controller 107 and determines the elements of the physical media libraries to which the host has access. The element addresses presented to the hosts can be logical addresses that media library controller 107 translates to the physical address of elements at physical media libraries 110 and 150. Thus, media library controller 107 can translate logical addresses used by the hosts to physical addresses at the physical media libraries.

A media library partition can span multiple physical media libraries. For example, controller 107 can configure a library partition having logical addresses that translate to physical addresses as shown in Table 1 (media library 110 is referred to by media library A and media library 150 is referred to by media library B):

TABLE 1

| Type | Logical Address | Physical Address | Media Library |
|---|---|---|---|
| Data Transport Element | 00h | 00h | A or B |
| Data Storage Element | 20h | 2Ah | A |
| | 21h | 2Bh | A |
| | 22h | 2Dh | A |
| | 23h | 35h | A |
| | 24h | 20h | B |
| | 25h | 21h | B |
| | 26h | 22h | B |
| | 27h | 23h | B |
| Data Transfer Element | 1E0h | 1E0h | A |
| | 1E1h | 1E1h | A |
| | 1E2h | 1E0h | B |
| Import/Export Element | Ah | Ah | A |

Table 2 illustrates an example MODE SENSE 0x1D page, as specified in the SCSI-2 and SCSI-3 standards, for the library partition defined in Table 1:

TABLE 2

| Element Type | Starting Address | Number of Elements |
|---|---|---|
| Medium Transport Element | 00h | 1 |
| Data Storage Element | 20h | 8 |
| Import/Export Element | Ah | 1 |
| Data Transfer Element | 1E0h | 3 |

If controller 107 returns the MODE SENSE page of Table 2 to a host, for example host 102a, in response to the MODE SENSE command requesting the 0x1D page, host applications at host 102a will operate as if there was a physical media library having a medium transport element at 00h, data storage elements at 20h-27h, an import export element at Ah and data transfer elements at 1E0h-1E3h. In other words, the host applications will formulate commands as if there was an available physical media library having these addresses.

When controller 107 receives a command from a host based on a library partition presented to the host, controller 107 translates the logical addresses in the command to the appropriate physical addresses. For example, if controller 107 receives a Move Medium command to move a cartridge from data storage element at logical element addresses 20h to the data transfer element at logical element address 1E0h, controller 107 will map the command to move the cartridge from physical address 2Ah of media library 110 to physical address 1E0h of media library 110 and will forward the command to media changer 112.

One embodiment of system for translating between logical and physical addresses is described in U.S. patent application Ser. No. 11/045,443, entitled "Method and System for Presenting Contiguous Element Addresses for a Partitioned Media Library" by Steven A. Justiss, et al., filed on Jan. 28, 2005 now U.S. Pat. No. 7,370,173 issued on May 6, 2008, which is hereby fully incorporated by reference herein. In this example, logical element addresses of an element type are assigned a base logical element address. Each physical element address is assigned an index value. The corresponding logical address for a physical element address is the base logical address plus the index value. Using the example of Table 1, the base logical element address for data storage elements is 20h, the index value for physical address 2Ah of media library 110 is 0, the index value for address 2Bh of media library 110 is 1 and so on as illustrated in Table 3.

TABLE 3

| INDEX | PHSICAL ADDRESS | MEDIA LIBRARY |
|---|---|---|
| 0 | 2Ah | A |
| 1 | 2Bh | A |
| 2 | 2Dh | A |
| 3 | 35h | A |
| 4 | 20h | B |
| 5 | 21h | B |
| 6 | 22h | B |
| 7 | 23h | B |

For a logical element address received from a host application, the controller can subtract the base logical element address for that element type to determine the index value and then find the corresponding physical element address. As one example, if controller 107 receives the value 25h from host 102a, it can subtract 20h yielding an index value of 5. The index value of 5 corresponds to physical element address 21h of media library 150.

It should be noted that the partitioning and address translation schemes described in conjunction with Tables 1-3 are provided by way of example and any media library aggregation and partitioning scheme can be implemented so long as controller 107 can translate addresses received from hosts to appropriate physical element addresses at the media libraries.

One issue that can arise in a library partition that spans physical media libraries such as that of Table 1 is that a host may issue a MOVE MEDIUM command that requires movement of media from an element in one physical media library to an element in another physical media library. U.S. patent application Ser. No. 10/703,965, entitled "System and Method for Controlling Access to Media Libraries" filed Nov. 7, 2003, which is hereby fully incorporated by reference herein addresses this issue through "spoofing" an element at the destination media library with an element at the source media library. In other words, while a host may issue a command to move a cartridge from a source element in the first media library to a destination element in the second media library, a controller (e.g., at a storage router) can reformat the request to move the cartridge to a destination element in the first media library (i.e., the same media library that contains the source element).

According to embodiments of the present invention, on the other hand, controller 107 can be configured to utilize pass through ports in addition to or in lieu of spoofing. When controller 107 receives a MOVE MEDIUM command from a host (referred to as the "original MOVE MEDIUM command") that references source and destination elements in different physical media libraries connected by a pass through port, controller 107 can implement processing to help ensure that the command can be completed. Controller 107, according to one embodiment, handles the original MOVE MEDIUM command in three phases. In the first phase, controller 107 checks the status of elements affected by the command (e.g., the destination element, the pass through port and/or other elements) to ensure that the cartridge (or optical disk or other medium) can be moved to the destination element. In the second phase, controller 107 issues a MOVE MEDIUM command to the source media library to move the medium from the source element address to the pass through port. In the third phase, controller 107 issues a MOVE MEDIUM command to move the medium from the pass through port to the destination element. The commands for each phase are queued in a command queue. If a command from a previous phase or a previous command from the same phase does not complete successfully, the sequence of commands can be terminated.

By way of example, assume controller 107 receives an initial MOVE MEDIUM command from host 102 to move a tape cartridge from storage element 22h to data transfer element 1E2h. Controller 107 maps the logical addresses to the appropriate physical addresses and determines if the command requires movement of a medium from on physical library to another physical media library. If the command does not require movement of a medium between physical media libraries, controller 107 can forward the command (with corresponding physical element addresses) to the appropriate physical media library. If, conversely, the command requires use of a pass through port to move the medium from physical media library to another physical media library, controller 107 can process the command to ensure that the command can be completed.

Returning to the previous example, the logical element addresses 22h and 1E2h translate to a storage element at physical element address 2Dh of media library 110 and a data transfer element at physical element address 1E0h at media library 150. Consequently, this command requires the cartridge to be passed from media library 110 to media library 150. Controller 107 can issue various commands to media changer 112 and media changer 152 to determine whether the cartridge can be moved and to effect movement of the cartridge.

According to one embodiment, the original Move Medium command is split into two Move Medium commands; one to move the cartridge from the source location to the pass through port at the source media library and one to move the cartridge from the pass through port to the destination location at the destination media library. The Command Descriptor Blocks ("CDB") of the move medium commands, including the original move medium command are saved in appropriate data structures. According to one embodiment, controller 107 can consider each original MOVE MEDIUM command to be an event and commands generated based on an original MOVE MEDIUM command to be states of that event. Thus, for example, the READ ELEMENT STATUS command and two MOVE MEDIUM commands can be considered states of an original MOVE MEDIUM command that are queued in an event queue.

To minimize the possibility that the cartridge can not be moved to the destination element address, controller 107 can check the status of the destination element by issuing a READ ELEMENT STATUS command to the appropriate media changer (media changer 152 in this example) to determine the status of the destination element. The original MOVE MEDIUM command, in one embodiment, is essentially replaced by a READ ELEMENT status command using the appropriate CDB. For example, a READ ELEMENT STATUS command with the CDB={b8 04 01f4 0001 00 000400 00 00} would elicit the status of an element at 0x01f4. The READ ELEMENT STATUS command is placed in an event queue. Once the event queue is signaled to start processing the commands, a task function that handles the queue can send out the READ ELEMENT STATUS command. When a response to the READ ELEMENT command is received, controller 107 can perform operations to validate that the physical media libraries are ready to move the cartridge from a source address in one physical media library to the other physical media library.

If the destination element is occupied, controller 107 can return an error message to the original MOVE MEDIUM command (e.g., CHECK CONDITION and MEDIUM DESTINATION ELEMENT FULL) and send the error message back to the host that issued the original MOVE MEDIUM command. If, on the other hand, the destination element is available, controller 107 can copy the previously constructed CDB for a MOVE MEDIUM command to move the cartridge from the source element to the pass through port into the CDB for the original MOVE MEDIUM command and place the MOVE MEDIUM command in the event queue. When the task function that manages the event queue is signaled to start processing the command, the task function sends out the MOVE MEDIUM command to the source media library. If this command completes with a non-good status, the non-good status is reported back to the host.

If the MOVE MEDIUM command to the source media library completes successfully, the CDB for the second MOVE MEDIUM command is copied into the CDB for the original MOVE MEDIUM command and the second MOVE MEDIUM command is placed in the event queue. This is a command to move the cartridge from the pass through port to the destination element. When the queue is signaled to start processing this command, the task function that handles the queue sends out the MOVE MEDIUM command to the destination media library.

In the example above, controller 107 sends a READ ELEMENT STATUS command to check the status of the destination element before sending MOVE MEDIUM commands to the source and destination media libraries. Another example of a status command that controller 107 can issue is a READ ELEMENT STATUS command to determine the status of a pass through port element address (e.g. the status of export element 122b for "outgoing" side pass through port 130 of media library 110) or other elements affected by the original MOVE MEDIUM command. If the pass through port is not available, controller 107 can, for example, requeue the sequence of commands or return an error to the host that issued the original MOVE MEDIUM command. This READ ELEMENT STATUS command can be issued in sequence or in parallel to a READ ELEMENT STATUS command for the destination element.

Because, in some embodiments such as those using the L700e, the pass through port "rotates" as a unit and the element at address 8h is used to move media from library 110 to library 150 and slot 9h is used to move media from library 150 to library 110, a MOVE MEDIUM command to Library 110 that places a cartridge in element 8h and MOVE MEDIUM command to media library 150 that places a cartridge in element 9h will not conflict. In this situation, the media transport element 154 of media library 150 can place its "in hand" cartridge in slot 9h without being blocked by the presence of the incoming cartridge in slot 8h. The pass through port may thus be occupied for purposes of a command requiring movement in one direction (e.g., from media library 110 to media library 150), but not commands requiring movement in the other direction.

When controller 107 determines that the original MOVE MEDIUM command will likely complete successfully—for example, when controller 107 validates the availability of destination physical element and the pass through port-controller 107 issues a MOVE MEDIUM command to move the medium from the source physical address to the pass through port. Returning to the previous example, controller 107 can issue a MOVE MEDIUM command to media changer 112 to move a tape cartridge from storage element 2Dh of physical media library 110 to the export slot at 8h. If this command completes successfully, controller 107 issues a MOVE MEDIUM command to media changer 162 to move the cartridge from the import slot at 8h to the data transfer element at 1E0h of media library 150. Controller 107 can issue the MOVE MEDIUM commands to the two media libraries sequentially. That is, the first MOVE MEDIUM command is issued and when it completes successfully the second MOVE MEDIUM command is issued. If the first MOVE MEDIUM command does not complete successfully, the sequence is terminated and an error is reported. Thus, for the original MOVE MEDIUM command, controller 107 can queue a sequence of commands (e.g., READ ELEMENT STATUS commands, MOVE MEDIUM commands or other commands) using any suitable command queuing scheme known or developed in the art. Controller 107 can complete issuing the sequence of commands for the original MOVE MEDIUM command before issuing the sequence of commands for a subsequent original MOVE MEDIUM command.

In the example provided above, import/export elements for the pass through port pass media in a particular direction. The availability of the pass through port can be determined by issuing a READ ELEMENT STATUS command to determine the status of import/export elements associated with the pass through port in a particular direction. For example, controller 107 can determine if pass through port 130 is available for a command passing a medium from media library 110 to media library 150 by checking the status of element 8h at media library 110 or media 150 with a READ ELEMENT STATUS command.

Contention for the same resource (i.e., contention between multiple original MOVE MEDIUM commands requesting passing of a medium from media library 110 to media library 150) is handled by command queuing as described above. Library access controller 107 queues various commands for each original MOVE MEDIUM command (e.g., the MOVE MEDIUM commands, READ ELEMENT STATUS commands generated based on an original MOVE MEDIUM command) and ensures that the sequence of commands corresponding to each original MOVE MEDIUM command completes before running the sequence of commands corresponding to a subsequent MOVE MEDIUM command contending for the same pass through port Command queuing essentially serializes commands that utilize the pass through port in a particular direction.

To further resolve contentions for pass through ports, particularly in cases where there are multiple pass through ports that pass media in the same direction or for import/export elements that can be used bi-directionally in the pass through port, controller 107 can maintain state information about the availability of particular pass through ports to pass a medium in a particular direction. For example, controller 107 can maintain a set of reservation flags for a pass through port indicating whether import/export elements for each pass through port are available. This can ensure Move Medium commands are held in queue until a pass through port element is available when there are multiple pass through ports that pass media in the same direction or for import/export elements that can be used bi-directionally in the pass through port. Table 4 illustrates an example of a case in which one direction of pass through port 130 is busy or reserved for a previous command while the other direction is available.

TABLE 4

| Media Library A | |
|---|---|
| 8h | x |
| 9h | ✓ |
| Media Library B | |
| 8h | x |
| 9h | ✓ |

Controller 107, in this example, can maintain reservation flags to indicate that import/export elements at address 8h of media library 110 and 150 are reserved. If controller 107 receives a command requiring movement of media from one physical media library to another, controller 107 can queue the original MOVE MEDIUM command and check the status of the pass through ports by reviewing the reservation flags. If no pass through ports are available to move a medium in a particular direction, controller 107 can maintain the command in a queue until the command can be processed. If a pass through port is available to move the medium in the direction required by the original MOVE MEDIUM command, controller 107 can flag import/export elements associated with the pass through port as unavailable and generate a MOVE MEDIUM command (or CDB) to move a cartridge from a source element to the import/export element associated with the pass through port at the source media library and a MOVE MEDIUM command (or CDB) to move the cartridge from the import/export element associated with the pass through port to the destination port at the destination media library. Events for the MOVE MEDIUM commands can be queued and a task function for managing the queue can send out the MOVE MEDIUM commands as described above.

The use of reservation flags allows controller 107 to maintain state information for pass through ports without requiring the use of a READ ELEMENT STATUS command to determine the status of an element associated with the pass through port. According to various embodiments of the present invention, however, controller 107 can optionally determine the availability of a pass through port by using reservation flags maintained by controller 107, issuing READ ELEMENT STATUS commands for elements associated with the pass through port(s) or both.

Thus, embodiments of the present invention provide a mechanism for ensuring a medium can be moved from one physical media library to another physical media library using a pass through port. The present invention prevents a medium from being removed from a location in response to a MOVE MEDIUM command that spans physical media libraries when the medium cannot be successfully placed in the pass through port or the destination location.

Figure 2:
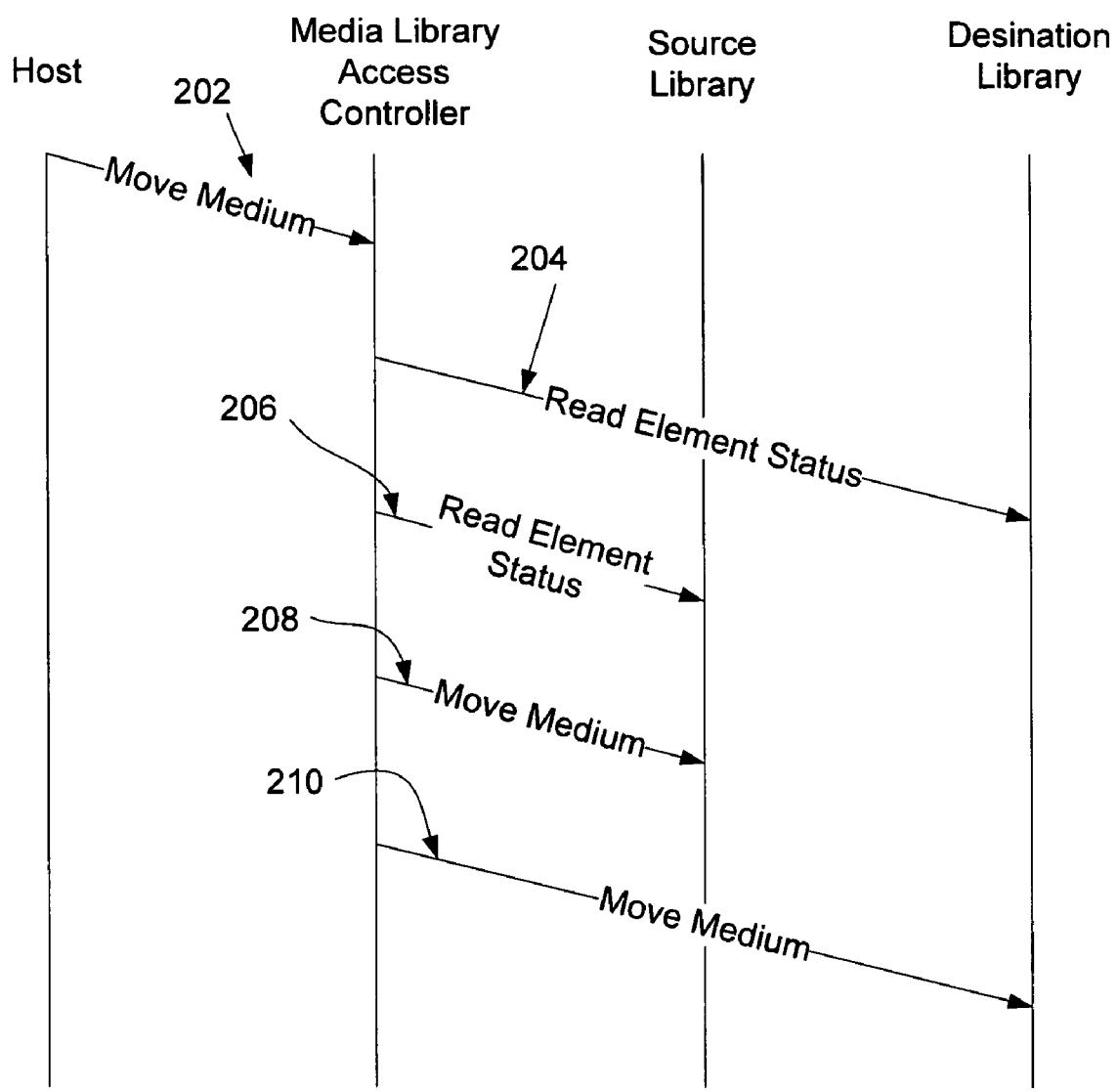
FIG. 2 is a diagrammatic representation of one embodiment of a command flow according to the present invention.

FIG. 2 is a diagrammatic representation of a command flow according to one embodiment of the present invention. The media library access controller (e.g., controller 107 of FIG. 1) receives the original MOVE MEDIUM command 202 from a host (e.g., host 102a of FIG. 1). The controller sends a READ ELEMENT STATUS command 204 to a destination media library (e.g., media library 150 of FIG. 1) to determine the status of the destination element. The controller can also send, sequentially or in parallel, a READ ELEMENT STATUS command 206 to the source media library (e.g., media library 110 of FIG. 1) to determine if the pass through port is available. If the destination element is free and the pass through port is available, the controller issues MOVE MEDIUM command 208 to the source media library to move the medium from the source element to the pass through port. If this command completes successfully, the controller issues MOVE MEDIUM command 210 to move the medium from the pass through port to the destination element.

Figure 3:
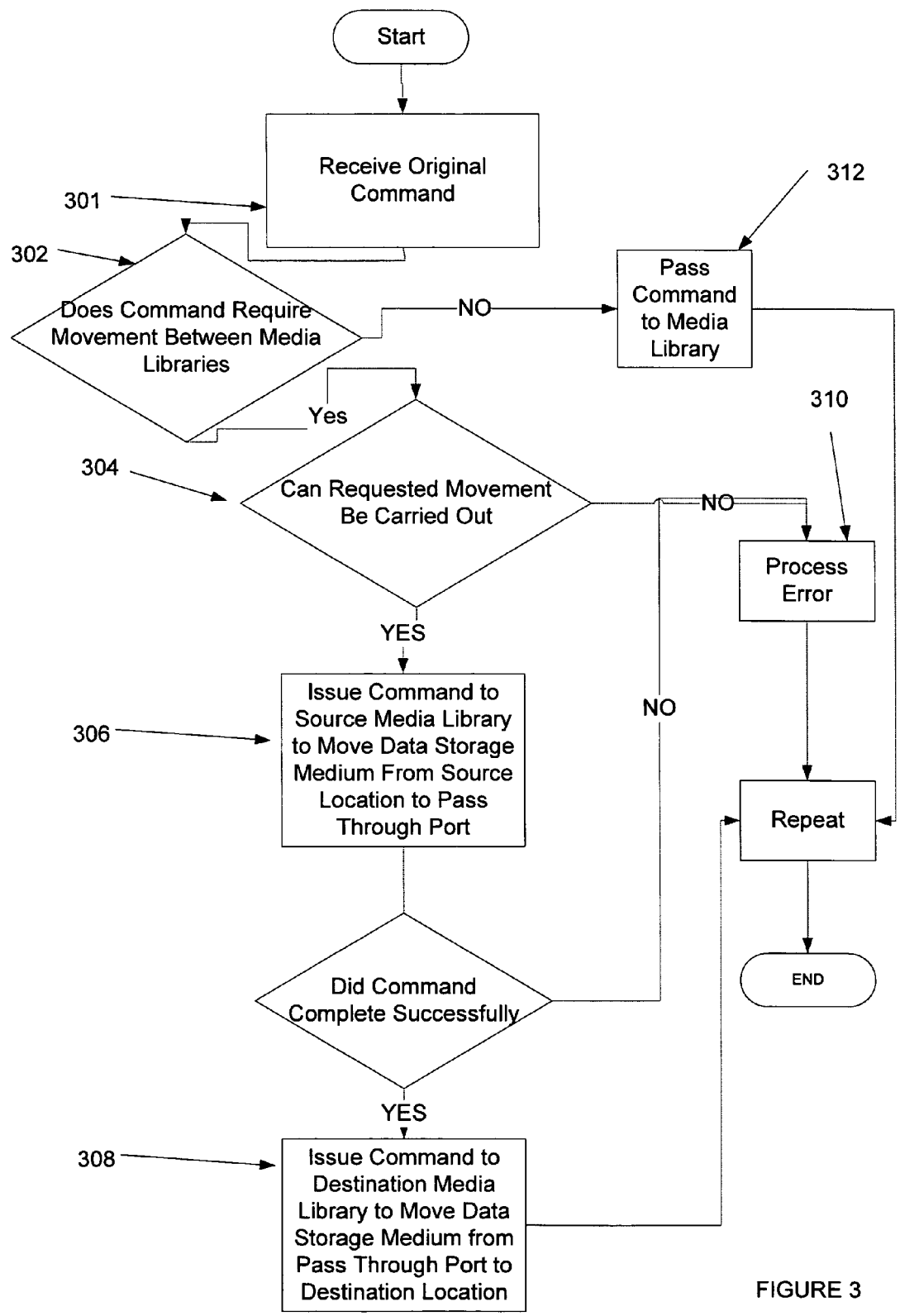
FIG. 3 is a flow chart illustrating one embodiment of a method for handling commands that request movement of a data storage medium between physical media libraries.

FIG. 3 is a flow chart illustrating one embodiment of a system for handling a command that requests moving a data storage medium from one physical media library to another physical media library. The method of FIG. 3 can be implemented as a computer program product that includes a set of computer instructions that are executable by a processor to carry out various functions. The computer instructions, according to one embodiment, can be executed by a media library access controller (e.g., controller 107 of FIG. 1) that controls access to multiple media libraries connected by one or more pass through ports. At step 301a library access controller can receive an original command requesting movement of a data storage medium (e.g., magnetic tape in a cartridge, optical disk or other data storage medium). The controller, at step 302 can determine if the command requires movement of a medium from a location (e.g., data transfer element, data storage element, import/export element) in a first physical media library to a location in as second physical media library that is connected to first physical media library by a pass through port. If so, control can pass to step 304; otherwise, control can pass to step 312.

The controller, at step 304, can determine if the movement requested in the received command can be carried out successfully by, for example, checking various statuses to determine if the movement requested in the original command can be carried out. For example, the controller can issue READ ELEMENT STATUS commands to the source and destination media libraries to determine the availability of the destination location or the status of the pass through port. According to another embodiment, the controller can check state information maintained by the controller (e.g., reservation flags) to determine the status of the pass through port.

If the movement requested by the original command can be carried out, the controller, at step 306, can issue a first MOVE MEDIUM command to the source media library to move the medium from the source location to the pass through port. If the first MOVE MEDIUM command completes successfully, the controller, at step 308, can issue a second MOVE MEDIUM command to the destination media library to move the medium from the pass through port to the destination location.

If the controller determines that the movement requested by the original MOVE MEDIUM command cannot be completed successfully or if the first or second MOVE MEDIUM commands issued respectively to the source and destination media libraries do not complete successfully, the controller can implement error processing (represented at 310). Error processing can include, for example, returning errors to the host that issued the original MOVE MEDIUM command, re-queuing the status commands and first and second MOVE MEDIUM command, dropping commands or other operations. If the original MOVE MEDIUM command does not require movement of a medium between physical media libraries, the controller can pass the command to the appropriate physical media library using the corresponding physical element addresses. The method of FIG. 3 can be repeated as needed or desired.

Figure 4:
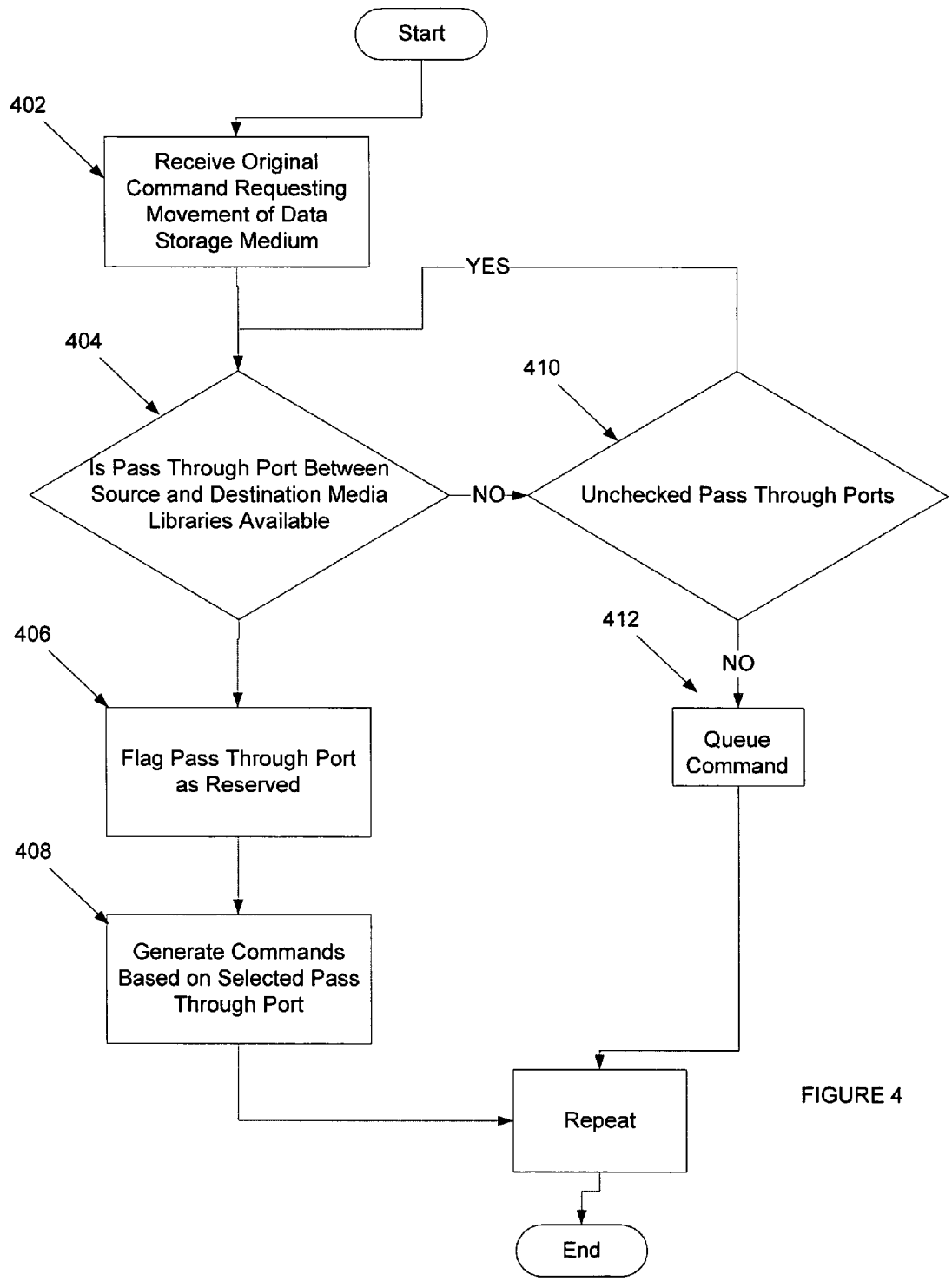
FIG. 4 is a flow chart illustrating one embodiment of a method for determining an available pass through port using reservation flags.

FIG. 4 is a flow chart illustrating one embodiment of a method for selecting a pass through port according to one embodiment of the present invention. The method of FIG. 4 can be implemented as a computer program product that includes a set of computer instructions that are executable by a processor to carry out various functions. The computer instructions, according to one embodiment, can be executed by a media library access controller (e.g., controller 107 of FIG. 1) that controls access to multiple media libraries connected by one or more pass through ports.

At step 402, the controller can receive an original MOVE MEDIUM command from a host requesting movement of a data storage medium from a source physical media library to a destination physical media library. The controller at step 404 can check a set of reservation flags maintained by the controller to determine if a particular pass through port is reserved for passing a medium in a particular direction. If the pass through port is not reserved, the controller, at step 406, can flag import/export elements associated with the pass through port as reserved and, at step 408, generate MOVE MEDIUM commands to move the data storage medium from the source location to the pass through port at the source media library and from the pass through port to the destination location at the destination media library.

If the controller determines at step 404 that a pass through port is reserved, the controller can cycle through other pass through ports between the source and destination media library until a free pass through port is found or all the reservation flags for all of the pass through ports have been checked (step 410). If no pass through port is available the original MOVE MEDIUM command can be requeued (represented at step 412) to be retried. It should be noted that, according to one embodiment, if for some period of time the command can not utilize the pass through port despite a defined number of retries, then the command can be declared in error and the appropriate error returned to the host.

Alternatively, controller 107 can select a pass through port and queue commands corresponding to the original MOVE MEDIUM command for that pass through port. In this case, the queue essentially serializes the original MOVE MEDIUM command received at step 402 behind a previous MOVE MEDIUM command that currently requires use of the selected pass through port. The method of FIG. 4 can be repeated as needed or desired.

Figure 5A:
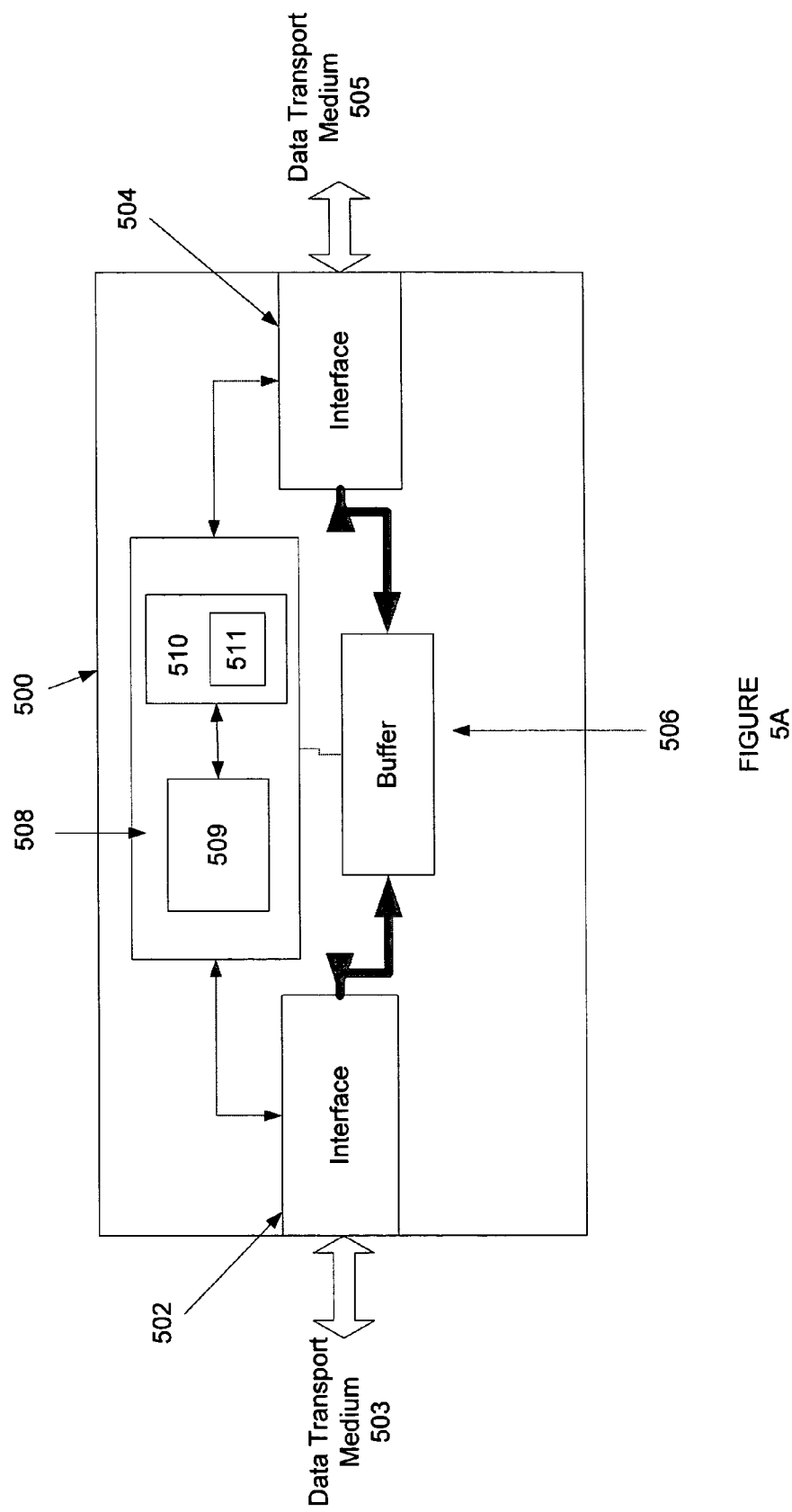
FIGS. 5A and 5B are diagrammatic representations of a controller according to one embodiment of the present invention.

FIG. 5A is a diagrammatic representation of a media library access controller 500 according to one embodiment of the present invention. In the example of FIG. 5A, controller 500 is a storage routing device. Controller 500 can comprise a first transport medium interface 502 that interfaces with a first transport medium 503 and a second transport medium interface 504 that interfaces with a second transport medium 505. In one embodiment of the present invention, the first transport medium 503 can be a Fibre Channel transport medium, the second transport medium 505 a SCSI bus, interface 502 a Fibre Channel controller, such as a fibre channel controller based on the TACHYON family of fibre channel control chips and interface 504 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5500x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; Fibre Channel and Fibre Advanced Technology Attachment ("FATA"); SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 506 provides memory work space and is connected to both interface 502 and to interface 504. Buffer 506 can be located remotely from routing device 500 and can also comprise multiple buffers. A processing unit 508 can be connected to interface 502, interface 504 and buffer 506. According to one embodiment of the present invention, processing unit 508 comprises one or more processors 509 for controlling operation of controller 500 and a computer readable medium 510 (RAM, ROM, flash memory, magnetic disk or other computer readable medium) accessible by the processor storing a set of computer instructions 511 that are executable by the processor. According to other embodiments of the present invention buffer 506 and/or computer readable medium 510 can be onboard processor 510.

In one implementation (not shown), the controller 500 can be a rack mount or free standing device with an internal power supply. Controller 500 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the controller 500 can support SCSI direct and sequential access target devices and can support SCSI initiators, as well. The Fibre Channel port can interface to fibre channel enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, present library partitions, translate between logical and physical addresses and generate commands and provide appropriate translations between the FC and SCSI data transport protocols (and for other protocols if necessary for other embodiments).

Figure 5B:
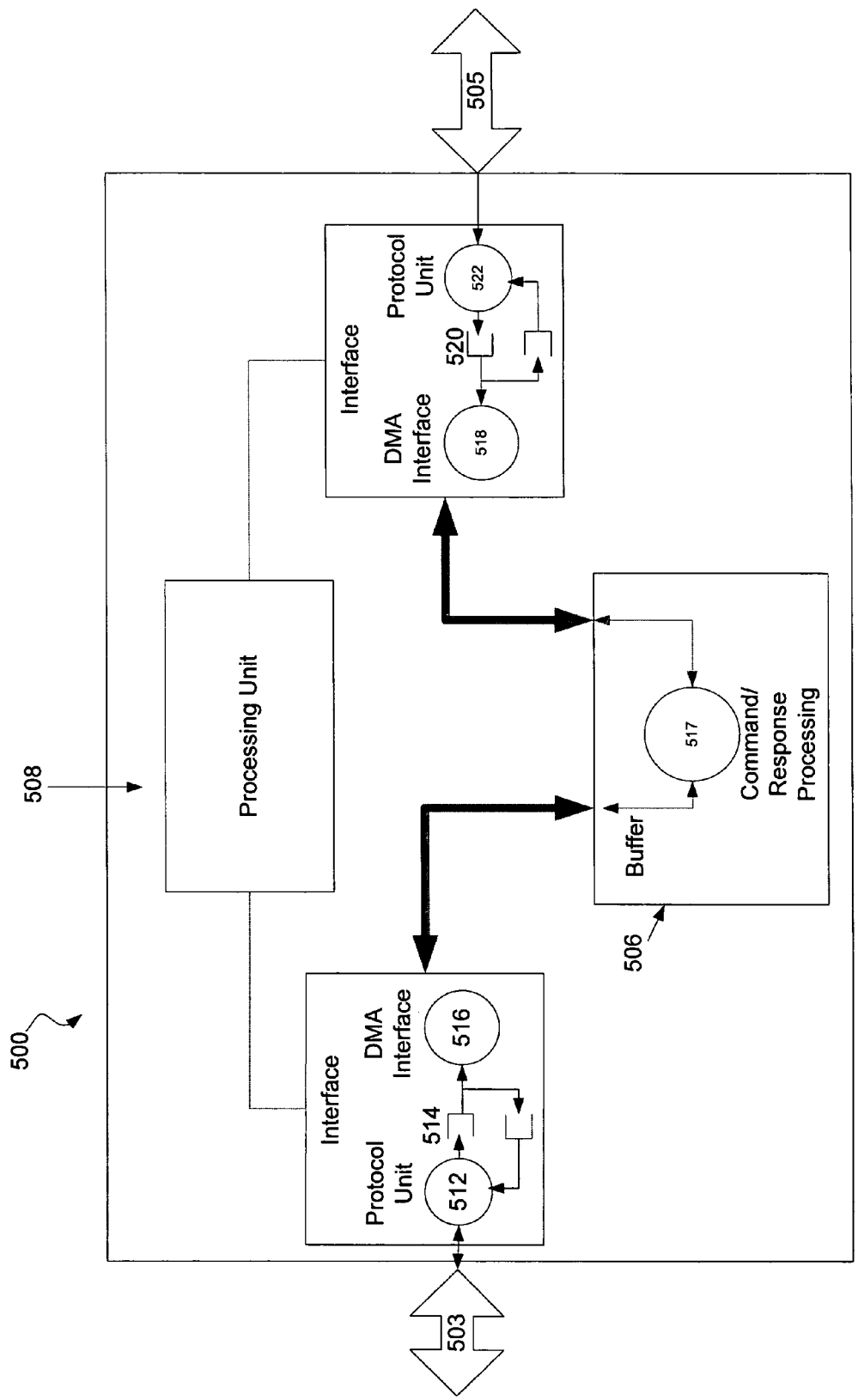

FIG. 5B is a block diagram of one embodiment of data flow within the controller 500 of FIG. 5A. As shown, data from first transport medium 503 (e.g., the Fibre Channel transport medium) is processed by a protocol unit 512 (e.g., a Fibre Channel protocol unit) and placed in a FIFO queue 514. A direct memory access (DMA) interface 516 can then take data out of FIFO queue 514 and places it in buffer 506.

Processing unit 508 processes the data in buffer 506 as represented by processing 517. This processing can include translating between physical and logical addresses for elements of media library. A DMA interface 518 then pulls data from buffer 506 and places it into a buffer 520. A second protocol unit 522 pulls data from buffer 520 and communicates the data on the second transport medium 505 (e.g., the SCSI bus). Data flow in the reverse direction, from the second data transport medium 505 to the first data transport medium 503, can be accomplished in a reverse manner.

In one embodiment, processing unit 508 can be operable to present a library partition to a host on first data transport medium 503. This can include selecting a base logical element address for an element type, associating an index with a set of physical element addresses and determining the corresponding logical element address by, for example, adding the base logical element address to the associated index value for a physical element address. Additionally, processing unit 508 can be operable to determine a physical element address for a logical element address. This can be done, for example, by subtracting the base logical element address from the logical element address to determine an associated index value. Using the associated index value, the processing unit can determine the appropriate physical element value. Processing unit 508 can further generate commands to the source and destination physical media libraries for a command received from a host including READ ELEMENT STATUS commands and MOVE MEDIUM commands. These commands can be used to determine if the movement requested in the original command can be carried out and to effect the movement as described above.

It should be noted that the controller of FIGS. 5A and 5B is provided by way of example. Embodiments of the present invention can be implemented in devices such as storage routing devices or other devices. Additionally, embodiments of the present invention can be implemented has hardware and/or software programming. Embodiments can be implemented through execution of computer instructions stored on any computer readable medium known in the art (e.g., optical disk, magnetic disk, flash memory, RAM, ROM, EEPROM or other computer readable medium).

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for handling a MOVE MEDIUM command requesting movement of a data storage medium between two physical media libraries comprising:
   providing a system comprising a library access controller connected to multiple host computers by a first transport medium and connected to a first physical media library and a second physical media library by a second transport medium;
   receiving an original MOVE MEDIUM command from a host computer requesting movement of a data storage medium from a source element at the first physical media library to a destination element at the second physical media library, wherein the first and second physical media libraries are connected by a pass through port;
   generating a set of commands associated with the original MOVE MEDIUM command, including a first READ ELEMENT command, a first MOVE MEDIUM command, and a second MOVE MEDIUM command, based on the original MOVE MEDIUM command;
   queuing the set of commands in a queue;
   issuing, from the queue, the first READ ELEMENT STATUS command associated with the original MOVE MEDIUM command to the second physical media library to determine the status of the destination element;
   if the destination element is free, issuing, from the queue, the first MOVE MEDIUM command associated with the original MOVE MEDIUM command to the first physical media library to move the data storage medium from the source element to a first element associated with the pass through port, otherwise not issuing the first MOVE MEDIUM command; and
   if the first MOVE MEDIUM command is issued and completes successfully, issuing, from the queue, the second MOVE MEDIUM command associated with the original MOVE MEDIUM command to the second physical media library to move the data storage medium from a second element associated with the pass through port to the destination element, otherwise not issue the second MOVE MEDIUM command;
   wherein the first MOVE MEDIUM command and second MOVE MEDIUM command are configured to cause the movement specified by the original MOVE MEDIUM command.

2. The method of claim 1, further comprising:
   wherein the set of commands further includes a second READ ELEMENT STATUS command;
   issuing, from the queue, the second READ ELEMENT STATUS command associated with the original MOVE MEDIUM command to the first physical media library to determine if the pass through port is free.

3. The method of claim 2, wherein the first READ ELEMENT STATUS command and the second READ ELEMENT STATUS command operate to determine whether the pass through port is free.

4. The method of claim 2, further comprising issuing, from the queue, the first and second READ ELEMENT STATUS commands in parallel.

5. The method of claim 2, further comprising issuing, from the queue, the first and second READ ELEMENT STATUS commands in sequence.

6. The method of claim 1, further comprising dropping the first and second MOVE MEDIUM commands from the queue if it is determined that the destination element is busy based on a response to the first READ ELEMENT status command.

7. The method of claim 1, further comprising maintaining a reservation flag for the pass through port when the pass through port is reserved.

8. A system comprising a media library access controller configured to control access by a host to a source media library and a destination media library that are connected to each other by a pass through port, the media library access controller comprising:
   a processor;
   a computer readable medium accessible by the processor; and
   a computer program product comprising a set of computer executable instructions stored on a computer readable medium, wherein the set of computer executable instructions are executable to:
      receive an original MOVE MEDIUM command from a host computer requesting movement of a data storage medium from a source element at a first physical media library to a destination element at a second physical media library, wherein the first and second physical media libraries are connected by a pass through port;

generate a set of commands associated with the original MOVE MEDIUM command, including a first READ ELEMENT STATUS command, a first MOVE MEDIUM command, and a second MOVE MEDIUM command, based on the original MOVE MEDIUM command;

queue the set of commands in a queue;

issue, from the queue, the first READ ELEMENT STATUS command associated with the original MOVE MEDIUM command to the second physical media library to determine the status of a destination element based on the original MOVE MEDIUM command;

if the destination element is free, issue, from the queue the first MOVE MEDIUM command associated with the original MOVE MEDIUM command to the first physical media library to move the data storage medium from the source element to a first element associated with the pass through port; and if the first MOVE MEDIUM command completes successfully, issue, from the queue the second MOVE MEDIUM command associated with the original MOVE MEDIUM command to the second physical media library to move the data storage medium from a second element associated with the pass through port to the destination element.

9. The system of claim 8, wherein the set of computer instructions further comprise instructions executable to:

wherein the set of commands further includes a second READ ELEMENT STATUS command;

issue, from the queue, the second READ ELEMENT STATUS command associated with the original MOVE MEDIUM command to the first physical media library to determine if the pass through port is free.

10. The system of claim 9, wherein the first READ ELEMENT STATUS command and the second READ ELEMENT STATUS command operate to determine whether the pass through port is free.

11. The system of claim 9, wherein the set of computer instructions further comprise instructions executable to issue, from the queue, the first and second READ ELEMENT STATUS commands in parallel.

12. The system of claim 9, wherein the set of computer instructions further comprise instructions executable to issue, from the queue, the first and second READ ELEMENT STATUS commands in sequence.

13. The system of claim 8, wherein the set of computer instructions further comprise instructions executable to drop the first and second MOVE MEDIUM commands from the queue if it is determined that the destination element is busy based on a response to the first READ ELEMENT status command.

14. The system of claim 9, wherein the set of computer instructions further comprise instructions executable to maintain a reservation flag for the pass through port when the pass through port is reserved.

15. A media library access controller configured to control access by a host to a source media library and a destination media library that are connected to each other by a pass through port, the media library access controller comprising:

a processor;

a computer readable medium accessible by the processor;

a set of computer instructions stored on the computer readable medium, wherein the set of computer instructions comprise instructions that are executable by the processor to:

receive an original MOVE MEDIUM command from a host requesting movement of a data storage element from a source physical media library to a destination physical media library connected by a pass through port;

generate a set of commands associated with the original MOVE MEDIUM command, including a first READ ELEMENT command, a first MOVE MEDIUM command, and a second MOVE MEDIUM command, based on the original MOVE MEDIUM command;

queue the set of commands in a queue;

issue, from the queue, the first READ ELEMENT STATUS command associated with the original MOVE MEDIUM command to a destination physical media library to determine the status of a destination element based on the original MOVE MEDIUM command;

if the destination element is free, issue, from the queue, the first MOVE MEDIUM command associated with the original MOVE MEDIUM command to the source physical media library to move the data storage medium from the source element to a first element associated with the pass through port, otherwise not issue the first MOVE MEDIUM command;

if the first MOVE MEDIUM command is issued and completes successfully, issue, from the queue, the second MOVE MEDIUM command associated with the original MOVE MEDIUM command to the destination physical media library to move the data storage medium from a second element associated with the pass through port to the destination element, otherwise not issue the second MOVE MEDIUM command; wherein the first MOVE MEDIUM command and second MOVE MEDIUM command are configured to a movement from the source element to the destination element specified by the original MOVE MEDIUM command received from the host.

16. The media library access controller of claim 15, wherein the set of computer instructions further comprise instructions executable to:

wherein the set of commands further includes a second READ ELEMENT STATUS command associated with the original MOVE MEDIUM command;

issue, from the queue, the second READ ELEMENT STATUS command to the source media library to determine if the pass through port is free.

17. The media library access controller of claim 16, wherein the first READ ELEMENT STATUS command and the second READ ELEMENT STATUS command operate to determine whether the pass through port is free.

18. The media library access controller of claim 16, wherein the set of computer instructions further comprise instructions executable to issue, from the queue, the first and second READ ELEMENT STATUS commands in parallel.

19. The media library access controller of claim 16, wherein the set of computer instructions further comprise instructions executable to issue, from the queue, the first and second READ ELEMENT STATUS commands in sequence.

20. The computer program product of claim 15, wherein the set of computer instructions further comprise instructions executable to drop the first and second MOVE MEDIUM commands from the queue if it is determined that the destination element is busy based on a response to first READ ELEMENT status command.

21. The media library access controller of claim 15, wherein the set of computer instructions further comprise instructions executable to maintain a reservation flag for the pass through port when the pass through port is reserved.

22. A method for handling a command requesting movement of a data storage medium between physical media libraries:
providing a media library access controller configured to control access by a host to a source media library and a destination media library that are connected to each other by a pass through port, the media library access controller comprising:
a processor;
a computer readable medium accessible by the processor;
a set of computer instructions stored on the computer readable medium, wherein the set of computer instructions comprise instructions that are executable by the processor to perform the steps of:
receiving, by the media library access controller, an original command requesting movement of a data storage medium from a source location at a source physical media library to a destination location at a destination physical media library, wherein the source and destination media libraries are connected by a pass through port;
generating a set of commands associated with the original command, including a first and a second command, based on the original command;
queuing the set of commands in a queue;
determining if the movement requested by the original command can be completed based on a status;
if it is determined that the data storage medium can be moved to the destination location based on the status:
issuing, from the queue, a first command associated with the original command to the source media library to move the data storage medium from the source location to the pass through port; and
issuing, from the queue, a second command associated with the original command to the destination media library to move the data storage medium from the pass through port at the destination media library to the destination location.

23. The method of claim 22, wherein determining if the movement requested by the original command can be completed based on a status further comprises determining the status of the destination location.

24. The method of claim 22, wherein determining if the movement requested by the original command can be completed based on a status further comprises determining the status of the pass through port.

25. The method of claim 22, wherein said issuing the second command to the destination media library is performed only if the first command to the source media library completes successfully.

26. A method for selecting a pass through port comprising:
maintaining a set of reservation flags at a media library access controller for one or more pass through ports connecting a source and destination media library;
receiving an original command requesting movement of a data storage medium from a source location at a source physical media library to a destination location at a destination physical media library, wherein the source and destination media libraries are connected by a pass through port;
determining if a particular pass through port is available for movement the medium from the source media library to the destination media library based on the set of reservation flags; and
if the particular pass through port is available,
marking the pass through port as reserved in the set of reservation flags to indicate the pass through port as unavailable to source media library while indicating the pass through port is available to the destination media library;
generating a set of commands associated with the original command, including a first and a second command, based on the original command;
queuing the set of commands in a queue;
issuing, from the queue, the first command associated with the original command to the source media library to move the data storage medium from a source location to the pass through port; and
issuing, from the queue, the second command associated with the original command to the destination media library to move the data storage medium from the pass through port to the destination location.

27. The method of claim 26, wherein the first command comprises a first MOVE MEDIUM command to move the data storage medium from a source element to an element associated with particular pass through port at the source media library and the second command comprises a second MOVE MEDIUM command to move the data storage medium from an element associated with particular pass through port at the destination media library to a destination element.

28. The method of claim 26, wherein if the particular pass through port is not available, continuing to check remaining pass through ports from the one or more pass through ports until an available pass through port is found or it is determined that there are no available pass through ports for movement of the media from the source media library to the destination media library.

29. A method for handling a command requesting movement of a data storage medium between two physical media libraries comprising:
providing a media library access controller configured to control access by a host to a source media library and a destination media library that are connected to each other by a pass through port, the media library access controller comprising:
a processor;
a computer readable medium accessible by the processor;
a set of computer instructions stored on the computer readable medium, wherein the set of computer instructions comprise instructions that are executable by the processor to perform the steps of:
receiving an original command requesting movement of a data storage medium from a source location at a source physical media library to a destination location at a destination physical media library, wherein the source and destination physical media libraries are connected by a pass through port;
generating a sequence of commands associated with the original command, including first and a second command, based on the original command;
queuing the sequence of commands for the original command, wherein the sequence of commands comprise:

a first command associated with the original command to move the medium from a source location at the source media library to the pass through port; and a second command associated with the original command to move the medium from the pass through port to the destination location at the destination media library; issuing, from the queue, the first command to the source media library; and if the first command completes successfully, issuing, from the queue, the second command to the destination media library.

30. The method of claim 29, wherein the original command, the first command and the second command comprise MOVE MEDIUM commands.

31. The method of claim 29, wherein the sequence of commands further comprises a READ ELEMENT STATUS command to determine a status of the destination location.

32. The method of claim 29, further comprising issuing the entire sequence of commands for the original command prior to issuing a subsequent sequence of commands for a subsequent original command.

\* \* \* \* \*